(12) United States Patent
Kodama et al.

(10) Patent No.: US 9,863,294 B2
(45) Date of Patent: Jan. 9, 2018

(54) HYDRAULIC CONTROL SYSTEM FOR VEHICLE

(71) Applicant: Toyota Jidosha Kabushiki Kaisha, Toyota-shi (JP)

(72) Inventors: Takuya Kodama, Aichi-gun (JP); Hiroaki Kimura, Toyota (JP); Shigeho Inaoka, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 236 days.

(21) Appl. No.: 14/851,399

(22) Filed: Sep. 11, 2015

(65) Prior Publication Data

US 2016/0076416 A1 Mar. 17, 2016

(30) Foreign Application Priority Data

Sep. 16, 2014 (JP) ................. 2014-187823

(51) Int. Cl.
| | |
|---|---|
| F01M 1/16 | (2006.01) |
| F01M 1/02 | (2006.01) |
| F01M 1/18 | (2006.01) |
| F01M 5/00 | (2006.01) |
| F16H 61/02 | (2006.01) |
| F16H 61/00 | (2006.01) |

(52) U.S. Cl.
CPC ............... *F01M 1/16* (2013.01); *F01M 1/02* (2013.01); *F01M 1/18* (2013.01); *F01M 5/005* (2013.01); *F16H 61/0031* (2013.01); *F16H 61/0206* (2013.01); *F01M 2001/0215* (2013.01); *F01M 2001/0269* (2013.01); *Y10S 903/904* (2013.01)

(58) Field of Classification Search
CPC .. F01M 1/16; F01M 1/02; F01M 1/18; F01M 5/005; F01M 2001/0215; F01M 2001/0269; F16H 61/0031; F16H 61/0206; Y10S 903/904
See application file for complete search history.

(56) References Cited

U.S. PATENT DOCUMENTS 4,445,818 A * 5/1984 Ohsaki ..................... B62D 5/32
417/288
6,386,170 B1 * 5/2002 Iwano ..................... F15B 1/024
123/196 R
(Continued)

FOREIGN PATENT DOCUMENTS

| JP | 2004-3425 A | 1/2004 |
|---|---|---|
| JP | 2011-978 | 1/2011 |

(Continued)

*Primary Examiner* — Michael A Riegelman
(74) *Attorney, Agent, or Firm* — Oblon, McClelland, Maier & Neustadt, L.L.P.

(57) ABSTRACT

A first check valve of a hydraulic control system allows oil to flow in only a direction from a first oil pump toward an oil receiving portion. A second check valve allows oil to flow in only a direction from a second oil pump toward the oil receiving portion. A third oil passage is configured to provide communication between a merging point of a first oil passage and a second oil passage, and the second oil pump by bypassing the second check valve. The third oil passage includes a throttle mechanism. The third oil passage is configured to restrict a flow rate of oil that is discharged from the second oil pump.

3 Claims, 5 Drawing Sheets

(56) References Cited

U.S. PATENT DOCUMENTS

| | | | |
|---|---|---|---|
| 6,692,402 B2* | 2/2004 | Nakamori | B60K 6/485 477/3 |
| 6,705,416 B1* | 3/2004 | Glonner | B60K 6/442 180/65.23 |
| 6,769,502 B2* | 8/2004 | Nakamori | B60K 6/365 180/65.25 |
| 6,848,548 B2* | 2/2005 | Alfredsson | F16H 61/0025 192/3.25 |
| 7,779,958 B2* | 8/2010 | Kitano | B60K 6/48 180/338 |
| 7,946,389 B2* | 5/2011 | Kakinami | F16H 57/04 123/196 R |
| 8,572,956 B2* | 11/2013 | Miyabe | F16H 61/0031 60/358 |
| 8,827,656 B2* | 9/2014 | Sano | F16H 61/0206 417/45 |
| 9,683,631 B2* | 6/2017 | Takayanagi | F16H 3/006 |
| 2002/0172604 A1* | 11/2002 | Berger | F01M 1/16 417/307 |
| 2003/0197385 A1 | 10/2003 | Onoyama et al. | |
| 2006/0065217 A1* | 3/2006 | Ikegawa | F01M 1/02 123/41.42 |
| 2006/0070600 A1* | 4/2006 | Hara | F01L 1/46 123/196 R |
| 2009/0175742 A1* | 7/2009 | Grethel | F04B 17/03 417/364 |
| 2009/0232673 A1* | 9/2009 | Reisch | F16H 57/0434 417/364 |
| 2010/0018808 A1* | 1/2010 | Gloge | F16H 61/0031 184/6.12 |
| 2011/0129356 A1* | 6/2011 | Kobayashi | F04C 2/102 417/44.1 |
| 2011/0166727 A1* | 7/2011 | Light | B60K 6/445 701/22 |
| 2012/0040792 A1* | 2/2012 | Ito | F16H 61/0025 475/115 |
| 2013/0319366 A1* | 12/2013 | Karasawa | F01M 1/02 123/196 R |
| 2016/0069231 A1* | 3/2016 | Nishimine | B60L 11/00 701/22 |
| 2016/0069428 A1* | 3/2016 | Takayanagi | B60K 6/383 60/420 |
| 2017/0016364 A1* | 1/2017 | Kazaoka | F01M 1/08 |

FOREIGN PATENT DOCUMENTS

| | | |
|---|---|---|
| JP | 2013-57342 A | 3/2013 |
| JP | 2013-142458 | 7/2013 |

\* cited by examiner

HYDRAULIC CONTROL SYSTEM FOR VEHICLE

INCORPORATION BY REFERENCE

The disclosure of Japanese Patent Application No. 2014-187823 filed on Sep. 16, 2014 including the specification, drawings and abstract is incorporated herein by reference in its entirety.

BACKGROUND OF THE INVENTION

1. Field of the Invention

The invention relates to a hydraulic control system for a vehicle, the hydraulic control system including a mechanical oil pump that is driven by a driving force source for the vehicle, such as an engine and a motor, and an electric oil pump that is driven by an electric motor different from the driving force source.

2. Description of Related Art

Japanese Patent Application Publication No. 2013-142458 (JP 2013-142458 A) describes the invention regarding an oil supply system including a mechanical oil pump and an electric oil pump as pumps for supplying oil. The oil supply system described in JP 2013-142458 A includes an electromagnetic valve as changing means for changing a communication state between a first oil discharge passage and a second oil discharge passage. The mechanical oil pump discharges oil through the first oil discharge passage. The electric oil pump discharges oil through the second oil discharge passage.

Japanese Patent Application Publication No. 2011-978 (JP 2011-978 A) describes the invention regarding an auxiliary pump drive control system. A mechanical oil pump and an electric oil pump (auxiliary pump) are provided. The mechanical oil pump is driven by an engine. The electric oil pump is driven by a driving source different from the engine. The auxiliary pump drive control system is configured to, when driving of the electric oil pump is started, drive the electric oil pump in the reverse direction. JP 2011-978 A also describes the configuration that the above-described electric oil pump is installed on the outer portion of a transmission case.

As in the case of the system described in JP 2013-142458 A or the system described in JP 2011-978 A, in the configuration that a mechanical oil pump and an electric oil pump are provided, usually, the output of an electric motor that drives the electric oil pump is considerably smaller than the output of a driving force source that drives the mechanical oil pump. Therefore, for example, when the electric oil pump is started up in a state where the viscosity of oil is high at a low temperature, the output of the electric motor may be insufficient for load on the electric oil pump, with the result that may not be possible to appropriately start up the electric oil pump.

In the system described in JP 2013-142458 A, at a startup of the electric oil pump, the open/closed state of the electromagnetic valve is changed such that oil flows back from the mechanical oil pump-side first oil discharge passage to the electric oil pump side. Thus, low-temperature high-viscosity oil remaining inside the electric oil pump or the second oil discharge passage is returned to an oil pan by the pressure of oil that is flowed back from the mechanical oil pump side. As a result, the inside of the electric oil pump or the second oil discharge passage is filled with oil raised in temperature at the mechanical oil pump side, and the electric oil pump is allowed to be early driven. However, by using the above-described electromagnetic valve, a system that controls the operation of the electromagnetic valve is required. Electric power needs to be externally supplied in order to actuate the electromagnetic valve. In addition, the electromagnetic valve is generally expensive. Therefore, in the system described in JP 2013-142458 A, the operation of the electromagnetic valve needs to be controlled. The energy efficiency of the system decreases by the amount by which electric power is consumed at the time of activating the electromagnetic valve. In addition, the cost of the electromagnetic valve becomes a factor of an increase in the cost of the system.

As in the case of the system described in JP 2011-978 A, by driving the electric oil pump in the reverse direction when driving of the electric oil pump is started, it is possible to return oil, remaining inside the electric oil pump and having a high viscosity at a low temperature because of outside air, to the oil pan. Together with this, it is possible to introduce relatively high-temperature low-viscosity oil stored in the oil pan and distribute the oil to the inside of the electric oil pump. Therefore, in the system described in JP 2011-978 A, by driving the electric oil pump in the reverse direction as described above and then driving the electric oil pump in the forward direction, it is possible to drive the electric oil pump at low load. However, even with such a configuration, eventually, the electric motor that drives the electric oil pump is required to provide power for making it possible to drive the electric oil pump in the reverse direction even in a state where the viscosity of oil inside the oil pan is high. An increase in the power of the electric motor leads to an increase in the size and weight of the system and an increase in cost.

In addition, at a startup of the electric oil pump in a state where the viscosity of oil is high as described above, the startup of the electric oil pump may not be appropriately carried out. In such a case, it is difficult to accurately determine whether it is due to insufficient power of the electric motor that drives the electric oil pump or it is due to a failure of the system. When the above-described failed startup of the electric oil pump is due to insufficient power of the electric motor, it is possible to deal with such a failed startup by retrying a startup of the electric oil pump or driving the mechanical oil pump by starting up the engine. On the other hand, when the above-described failed startup of the electric oil pump is due to a failure of the system, it may be necessary to quickly stop or suppress the driving of the electric oil pump in order to suppress useless consumption of electric power for driving the electric motor or prevent a further secondary failure.

SUMMARY OF THE INVENTION

This application is directed to a hydraulic control system including the above-described mechanical oil pump and electric oil pump. This application provides a hydraulic control system for a vehicle, which is able to improve the startability of the electric oil pump without leading to the complexity of the system, an increase in size, an increase in cost, or the like.

A hydraulic control system related to the present invention is for a vehicle including at least an engine. The hydraulic control system includes a first oil pump, a second oil pump, an oil receiving portion, a first oil passage, a second oil passage, a first check valve, a second check valve and a third oil passage. The first oil pump is a mechanical oil pump. The first oil pump is configured to be driven by a driving force source of the vehicle to generate hydraulic pressure. The second oil pump is an electric oil pump. The second oil pump is configured to be driven by an electric motor to generate hydraulic pressure. The electric motor is different from the driving force source. The oil receiving portion is configured to be supplied with oil that is discharged from the first oil pump or the second oil pump. The first oil passage is configured to provide communication between the first oil pump and the oil receiving portion. The second oil passage is configured to provide communication between the second oil pump and the oil receiving portion. The first check valve is provided between a merging point and the first oil pump. The first check valve is configured to allow oil to flow in only a direction from the first oil pump toward the oil receiving portion. The merging point is a portion at which the first oil passage and the second oil passage merge with each other. The second check valve is provided between the merging point and the second oil pump. The second check valve is configured to allow oil to flow in only a direction from the second oil pump toward the oil receiving portion. The third oil passage is configured to provide communication between the merging point and the second oil pump by bypassing the second check valve. The third oil passage includes a throttle mechanism. The third oil passage is configured to restrict a flow rate of oil that is discharged from the second oil pump.

The hydraulic control system includes the third oil passage that communicates the mechanical oil pump with the electric oil pump. For example, the throttle mechanism, such as an orifice and a throttle valve, is provided in the third oil passage. Therefore, by driving the mechanical oil pump at the time of starting up the electric oil pump, it is possible to flow oil, which is discharged from the mechanical oil pump, back to the electric oil pump side and transfer the oil to the electric oil pump side. For example, in a state where the viscosity of oil is high at a low temperature, the power of the electric motor that drives the electric oil pump may be insufficient, and it may not be possible to appropriately start up the electric oil pump. In contrast, in this invention, at the time of starting up the electric oil pump as described above, it is possible to forcibly flow oil back to the electric oil pump side with the use of the mechanical oil pump having a larger power than the electric oil pump. Therefore, it is possible to transfer relatively high-temperature oil around the mechanical oil pump to the electric oil pump side. Alternatively, it is possible to transfer low-viscosity oil to the electric oil pump side by forcibly feeding the oil under pressure with the use of the mechanical oil pump. Therefore, it is possible to reduce load on the electric motor at the time of starting up the electric oil pump, so it is possible to improve the startability of the electric oil pump.

The first oil pump may be configured to be driven by rotating a crankshaft of the engine to generate hydraulic pressure, and oil may be able to flow from the first oil pump to the second oil pump via the third oil passage.

When the mechanical oil pump is driven at the time of starting up the electric oil pump as described above, for example, it is possible to drive the mechanical oil pump together with the crankshaft of the engine by starting up the engine to rotate the crankshaft. Alternatively, by not operating the engine through combustion but motoring the engine to rotate the crankshaft, it is possible to drive the mechanical oil pump. It is possible to easily flow oil, which is discharged from the mechanical oil pump by hydraulic pressure generated by driving the mechanical oil pump, back to the electric oil pump side.

The hydraulic control system may further includes an electronic control unit, a casing, an oil temperature sensor, and a coolant temperature sensor. The casing accommodates at least the first oil pump. The oil temperature sensor is configured to detect a temperature of oil inside the casing. The coolant temperature sensor is configured to detect a temperature of coolant of the engine. The electronic control unit may be configured to drive the second oil pump, when the temperature of the oil is higher than or equal to a predetermined oil temperature and the temperature of the coolant is higher than or equal to a predetermined coolant temperature, The electronic control unit may be configured to drive the second oil pump after rotating the crank shaft, when the temperature of the oil is higher than or equal to the predetermined oil temperature and the temperature of the coolant is lower than the predetermined coolant temperature.

With the above-described hydraulic control system, it is determined whether driving of the electric oil pump is allowed on the basis of a detected value of the oil temperature sensor and a detected value of the coolant temperature sensor. That is, when the oil temperature is lower than the predetermined temperature, the viscosity of oil is high, so it may be determined that the power of the electric motor that drives the electric oil pump is insufficient. Therefore, driving of the electric oil pump is not allowed. When the oil temperature is higher than or equal to the predetermined temperature and the coolant temperature is higher than or equal to the predetermined coolant temperature, the viscosity of oil is low, so it may be determined that it is possible to appropriately drive the electric oil pump. Therefore, in this case, driving of the electric oil pump is allowed. When the oil temperature is higher than or equal to the predetermined temperature and the coolant temperature is lower than the predetermined coolant temperature, the viscosity of oil is decreased by flowing oil back to the electric oil pump side by driving the mechanical oil pump so it may be determined that it is possible to appropriately drive the electric oil pump. In this case, for example, by starting up the engine to rotate the crankshaft or by not operating the engine through combustion but motoring the engine to rotate the crankshaft, it is possible to drive the mechanical oil pump together with the crankshaft of the engine. Thus, it is possible to easily flow oil, which is discharged from the mechanical oil pump by hydraulic pressure generated by driving the mechanical oil pump, back to the electric oil pump side. After that, driving of the electric oil pump is allowed. In this way, according to the invention, it is possible to appropriately drive the electric oil pump depending on circumstances.

The electronic control unit may be configured to suppress driving of the second oil pump, when a rotation speed of the second oil pump is lower than a predetermined rotation speed after the second oil pump starts to be driven.

As described above, the hydraulic control system determines whether driving of the electric oil pump is allowed, allows the electric oil pump to be driven, and then starts driving the electric oil pump. At this time, it is determined whether there is a failure associated with the electric oil pump on the basis of the rotation speed of the electric oil pump. That is, when the rotation speed of the electric oil pump does not reach the predetermined rotation speed although driving of the electric oil pump is allowed and the driving is started, it is determined that there is a failure in the electric oil pump or in the structure associated with the electric oil pump. Therefore, in this case, driving of the electric oil pump is suppressed, which includes the case where driving of the electric oil pump is stopped. Therefore, when there occurs a failure, it is possible to suppress excessive consumption of electric power at the time when the electric oil pump is driven. It is also possible to prevent occurrence of a secondary failure due to the fact that the electric oil pump is continuously driven in a state where there is a failure.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
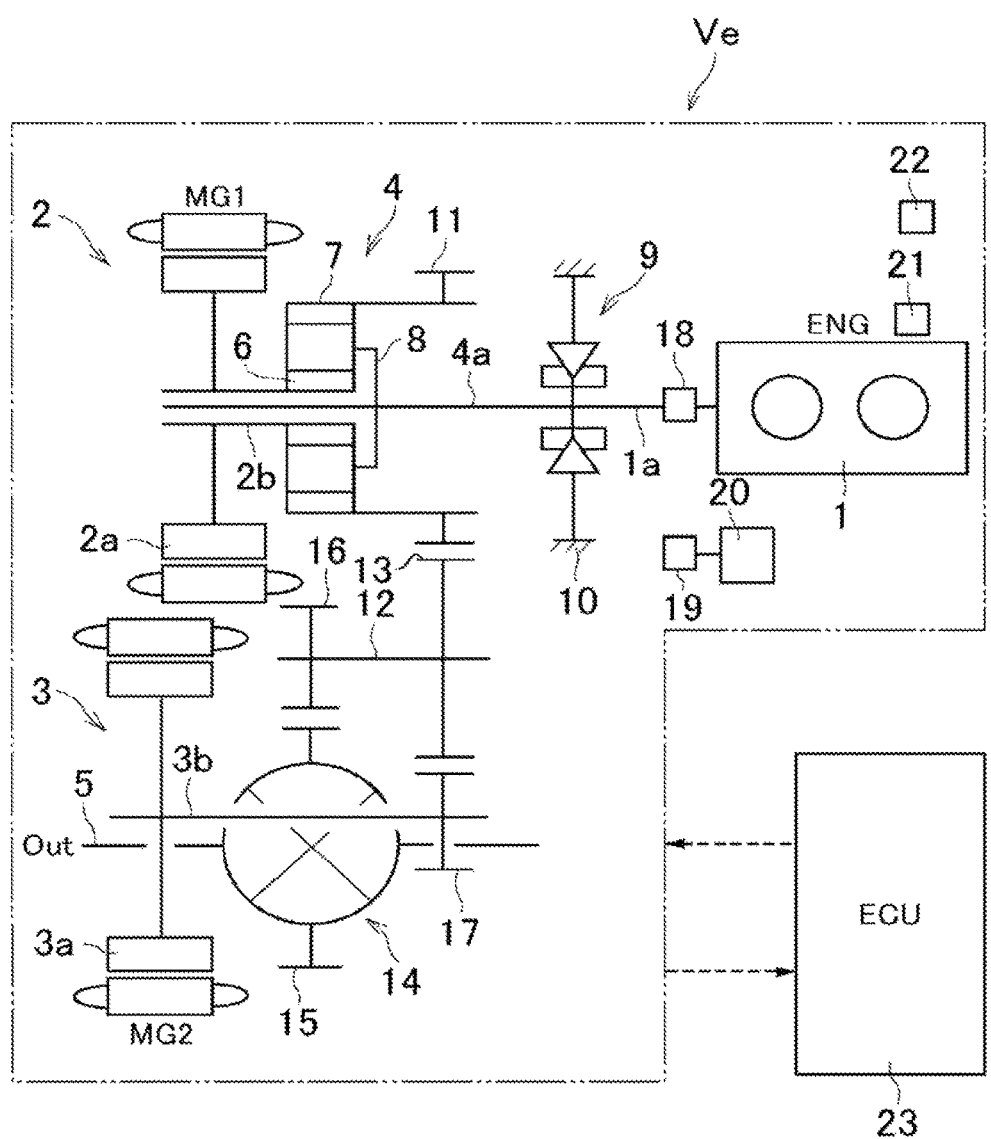
FIG. 1 is a view that shows an example of a vehicle that may be a subject of the invention.

An embodiment of the invention will be specifically described with reference to the accompanying drawings. Initially, FIG. 1 shows an example of a vehicle that may be a subject of the invention. The vehicle that is a subject of the invention, as will be described later, includes a mechanical oil pump and an electric oil pump. The mechanical oil pump is driven by a driving force source of the vehicle to generate hydraulic pressure. The electric oil pump is driven by an electric motor, different from the driving force source of the vehicle, to generate hydraulic pressure. The vehicle is configured to, when the vehicle temporarily stops the operation of the driving force source while the vehicle is traveling or the vehicle is temporarily stopped, keep supplying oil by driving the electric oil pump. The vehicle that temporarily stops the operation of the driving force source while the vehicle is traveling or the vehicle is temporarily stopped includes, for example, a vehicle equipped with an idling stop function that temporarily stops the operation of an engine during a stop of the vehicle, a hybrid vehicle on which an engine and a motor are mounted as driving force sources, and the like. FIG. 1 shows an example of the hybrid vehicle as a typical example of such a vehicle.

The vehicle Ve shown in FIG. 1 is a hybrid vehicle that uses an engine (ENG) 1, a first motor generator (MG1) 2 and a second motor generator (MG2) 3 as driving force sources. The vehicle Ve is configured to split power, which is output from the engine 1, by a power split mechanism 4 and transmit the split power to the first motor generator 2 side and a drive shaft 5 side. The vehicle Ve is also configured to be able to supply electric power, generated by the first motor generator 2, to the second motor generator 3 and add power, which is output from the second motor generator 3, to the drive shaft 5.

The engine 1 is configured such that adjustment of the output and the operation of a startup or stop of the engine 1 are electrically controlled. For example, in the case of a gasoline engine, a throttle opening degree, the amount of fuel supplied, ignition or stop of ignition, ignition timing, and the like, are electrically controlled.

Each of the first motor generator 2 and the second motor generator 3 is a motor having a power generating function, and is, for example, a permanent magnet synchronous motor, or the like. Each of the first motor generator 2 and the second motor generator 3 is connected to a battery (not shown) via an inverter (not shown), and is configured such that the rotation speed, torque, a changeover between the function of a motor and the function of a generator, and the like, are electrically controlled.

The power split mechanism 4 is formed of a differential mechanism including three rotating elements. Specifically, the power split mechanism 4 is formed of a planetary gear mechanism including a sun gear 6, a ring gear 7 and a carrier 8. In the example shown in FIG. 1, a single pinion-type planetary gear mechanism is used.

The planetary gear mechanism that constitutes the power split mechanism 4 is arranged along the same rotation axis as an output shaft 1a of the engine 1. The first motor generator 2 is coupled to the sun gear 6 of the planetary gear mechanism. The first motor generator 2 is arranged next to the power split mechanism 4 across from the engine 1. A rotor shaft 2b that rotates integrally with a rotor 2a of the first motor generator 2 is coupled to the sun gear 6. The ring gear 7, which is an internal gear, is arranged concentrically with respect to the sun gear 6. Pinion gears are in mesh with these sun gear 6 and ring gear 7. The pinion gears are held by the carrier 8 so as to be rotatable and revolvable. An input shaft 4a of the power split mechanism 4 is coupled to the carrier 8. The output shaft 1a of the engine 1 is coupled to the input shaft 4a via a one-way brake 9.

The one-way brake 9 is provided between the output shaft 1a or the carrier 8 and a fixed member 10, such as a housing. The one-way brake 9 is configured to, when torque in a direction opposite to the rotation direction of the engine 1 acts on the output shaft 1a or the carrier 8, be engaged to stop the rotation of the output shaft 1a or the carrier 8. By using the thus configured one-way brake 9, it is possible to stop the rotation of each of the output shaft 1a and the carrier 8 in response to the direction in which torque acts.

A drive gear 11, which is an external gear, is integrally formed at the outer peripheral portion of the ring gear 7 of the planetary gear mechanism. A counter shaft 12 is arranged parallel to the rotation axis of the power split mechanism 4, the first motor generator 2, or the like. A counter driven gear 13 is connected to one (right-side in FIG. 1) end of the counter shaft 12 so as to rotate integrally with the counter shaft 12. The counter driven gear 13 is in mesh with the drive gear 11. A counter drive gear 16 is connected to the other (left-side in FIG. 1) end of the counter shaft 12 so as to rotate integrally with the counter shaft 12. The counter drive gear 16 is in mesh with a ring gear 15 of a differential gear 14 that is a final reduction gear. Therefore, the ring gear 7 of the power split mechanism 4 is coupled to the drive shaft 5 via a gear train and the differential gear 14. The gear train is formed of the drive gear 11, the counter shaft 12, the counter driven gear 13 and the counter drive gear 16.

Torque that is output from the second motor generator 3 is allowed to be added to torque that is transmitted from the power split mechanism 4 to the drive shaft 5. That is, the second motor generator 3 is arranged parallel to the counter shaft 12. A reduction gear 17 is coupled to a rotor shaft 3b that rotates integrally with a rotor 3a of the second motor generator 3. The reduction gear 17 is in mesh with the counter driven gear 13. Therefore, the drive shaft 5 and the second motor generator 3 are coupled to the ring gear 7 of the power split mechanism 4 via the above-described gear train or the reduction gear 17.

Two oil pumps are provided in the vehicle Ve in order to cool or lubricate the first motor generator 2, the second motor generator 3, the planetary gear mechanism in the power split mechanism 4, and the like. The two oil pumps are a first oil pump 18 and a second oil pump 19.

The first oil pump 18 is a general mechanical oil pump that is conventionally used in an engine or a transmission for a vehicle as a pump for supplying oil and controlling hydraulic pressure. The first oil pump (hereinafter, the MOP) 18 is configured to be driven by torque that is output from the engine 1 to generate hydraulic pressure. Specifically, the rotor (not shown) of the MOP 18 is configured to rotate together with the crankshaft (not shown) of the engine 1. Therefore, when the engine 1 is operated through combustion to output torque from the crankshaft, the MOP 18 is also driven to generate hydraulic pressure. By not operating the engine 1 through combustion but motoring the engine 1 with the use of a startup starter motor (not shown), or the like, the MOP 18 is driven together with the crankshaft, so it is possible to generate hydraulic pressure.

As described above, the MOP 18 is not able to generate hydraulic pressure when the rotation of the crankshaft of the engine 1 is stopped. Therefore, the vehicle Ve includes the second oil pump 19 in order to keep supplying oil to oil receiving portions, such as the first motor generator 2, the second motor generator 3 and the power split mechanism 4 even when the engine 1 is stopped.

The second oil pump 19 is an electric oil pump that is driven by torque that is output from an electric motor to generate hydraulic pressure. Therefore, the second oil pump (hereinafter, the EOP) 19 is provided in association with a pump motor 20 for driving the EOP 19. The pump motor 20 is an electric motor different from the driving force sources of the vehicle Ve, such as the engine 1, the first motor generator 2 and the second motor generator 3, and is exclusively provided for the EOP 19.

The engine 1 includes a coolant temperature sensor 21. The coolant temperature sensor 21 is used to detect the temperature of coolant that cools the engine 1. The coolant temperature sensor 21 is, for example, configured to detect the temperature of coolant in a radiator (not shown) of the engine 1. Therefore, the coolant temperature sensor 21 is installed near the radiator outside an engine case. Therefore, the coolant temperature sensor 21 may be used as an alternative to an outside air temperature sensor. That is, it is possible to estimate an outside air temperature from a detected value of the coolant temperature sensor 21.

An oil temperature sensor 22 is provided. The oil temperature sensor 22 is used to detect the temperature of oil that is supplied to the oil receiving portions by the MOP 18 or the EOP 19. The oil temperature sensor 22 is, for example, configured to detect the temperature of oil stored in an oil pan inside a casing 43 (described later). Therefore, it is possible to estimate the state of oil inside the casing 43 on the basis of a detected value of the oil temperature sensor 22. Specifically, it is possible to estimate the viscosity of oil inside the casing 43.

An electronic control unit (ECU) 23 is provided in order to execute control for operating the engine 1, control for rotating the first motor generator 2 and the second motor generator 3, control for rotating the pump motor 20, and the like. The ECU 23 is, for example, mainly formed of a microcomputer. For example, detected values of the above-described coolant temperature sensor 21, oil temperature sensor 22, and the like, are input to the ECU 23. The ECU 23 is configured to execute computation by using those input data, prestored data, and the like, and output a control command signal on the basis of the computed result.

The above-described vehicle Ve is a hybrid vehicle. Therefore, the vehicle Ve is changed as needed between an HV mode and an EV mode in response to the traveling state, required driving force, and the like, of the vehicle Ve. In the HV mode, the vehicle Ve is caused to travel by using at least the output of the engine 1. In the EV mode, the vehicle Ve is caused to travel by using the output of at least one of the first motor generator 2 or the second motor generator 3 while the operation of the engine 1 is stopped. In the EV mode, because the rotation of the crankshaft of the engine 1 is stopped, it is not possible to generate hydraulic pressure with the use of the MOP 18. When the vehicle Ve is caused to carry out EV traveling by using the output of the second motor generator 3 in the EV mode, oil is particularly required to lubricate and cool the second motor generator 3. When the vehicle Ve is caused to carry out EV traveling by using the output of both the first motor generator 2 and the second motor generator 3, oil is required to lubricate and cool the planetary gear mechanism of the power split mechanism 4 in addition to the first motor generator 2 and the second motor generator 3. Therefore, in the vehicle Ve, the EOP 19 is driven when the EV mode is set or when the engine 1 is stopped. That is, the vehicle Ve is controlled such that the pump motor 20 is started up to generate hydraulic pressure with the use of the EOP 19.

When the vehicle Ve is not a hybrid vehicle as described above but, for example, a vehicle that uses an engine as a driving force source and that has an idling stop function, the pump motor 20 is controlled so as to drive the EOP 19 to generate hydraulic pressure at the time when the rotation of the crankshaft of the engine stops by the idling stop function.

Figure 2:
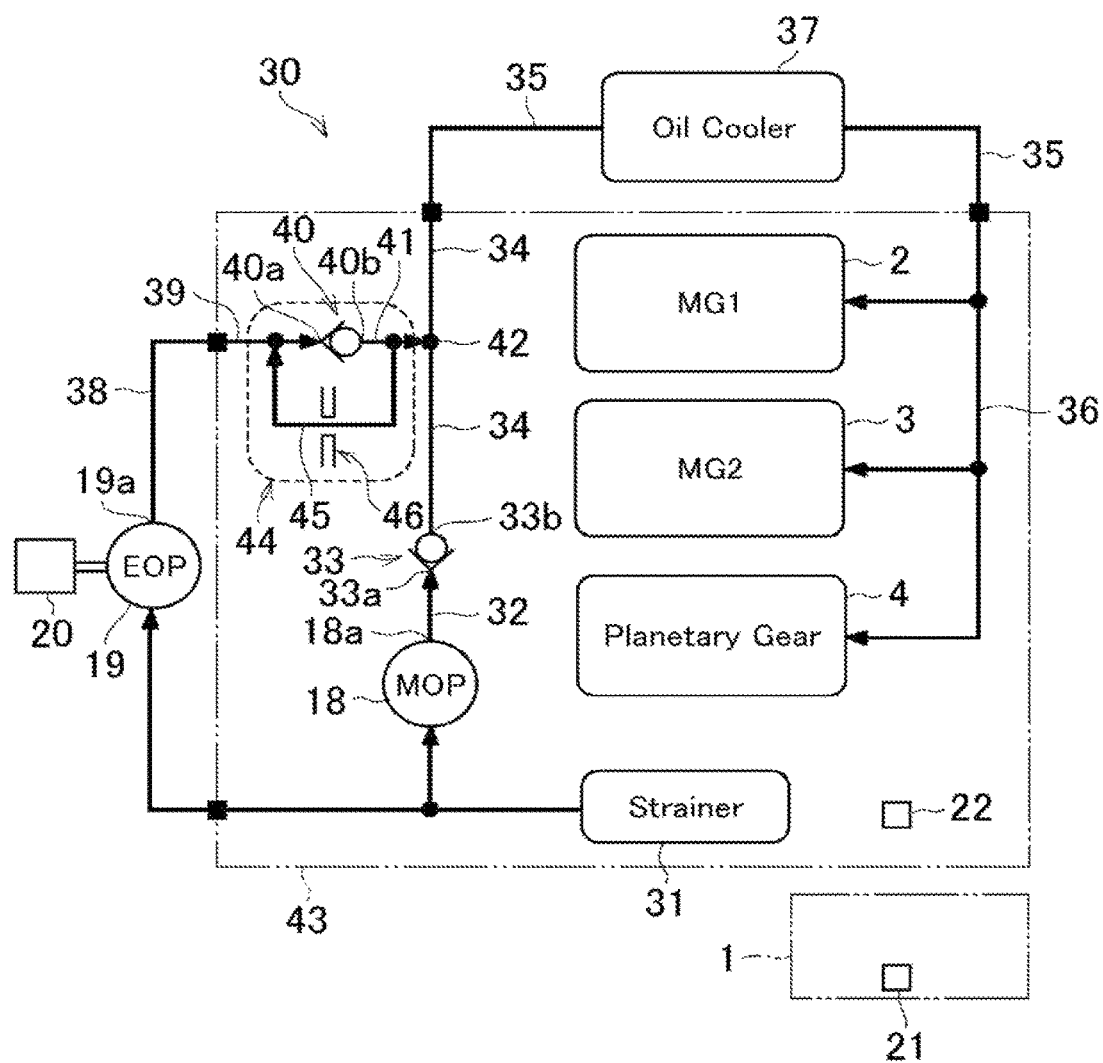
FIG. 2 is a view that shows an example of a hydraulic circuit that constitutes a hydraulic control system according to the invention.

FIG. 2 shows an example of a hydraulic control system that uses the above-described MOP 18 and EOP 19 as hydraulic pressure generating sources. Specifically, FIG. 2 shows a hydraulic circuit 30 that runs from the MOP 18 and the EOP 19 to the oil receiving portions of the first motor generator 2, the second motor generator 3 and the planetary gear mechanism of the power split mechanism 4. The MOP 18 draws oil from the oil pan (not shown) via a strainer 31, and discharges the oil having a hydraulic pressure from a discharge port 18a. The discharge port 18a of the MOP 18 communicates with an inlet port 33a of a check valve 33 via an oil passage 32. An outlet port 33b of the check valve 33 communicates with the oil receiving portions of the first motor generator 2, the second motor generator 3 and the power split mechanism 4 via an oil passage 34, an oil passage 35 and an oil passage 36.

The check valve 33 is configured to allow oil to flow in only the direction from the discharge port 18a of the MOP 18 toward the oil passage 34. The check valve 33 and the oil passages 32, 34, 36 are provided inside the casing 43 (described later). In contrast, the oil passage 35 is provided outside the casing 43. The oil passage 34 and the oil passage 36 communicate with each other via the oil passage 35.

An oil cooler 37 is provided in the oil passage 35. The oil cooler 37 forcibly cools oil flowing through the oil passages 34, 35, 36, and is, for example, a water-cooled oil cooler. In the example shown in FIG. 2, the oil cooler 37, together with the oil passage 35, is arranged outside the casing 43 (described later).

The oil receiving portions of the first motor generator 2 and the oil receiving portions of the second motor generator 3 are, for example, portions that need to be lubricated and cooled by oil, such as coil ends and rotary sliding portions of the first motor generator 2 and second motor generator 3.

The oil receiving portions of the power split mechanism 4 are, for example, portions that need to be lubricated and cooled by oil, such as meshing portions and rotary sliding portions of gears in the planetary gear mechanism that constitutes the power split mechanism 4.

The EOP 19 is provided in parallel with the above-described MOP 18. The EOP 19, as well as the MOP 18, draws oil from the oil pan (not shown) via the strainer 31, and discharges the oil having a hydraulic pressure from a discharge port 19a. The discharge port 19a of the EOP 19 communicates with an inlet port 40a of a check valve 40 via an oil passage 38 and an oil passage 39. An outlet port 40b of the check valve 40 communicates with the oil passage 34 via an oil passage 41 at a merging point 42 in the oil passage 34. In the example shown in FIG. 2, the merging point 42 is provided in the oil passage 34 between the check valve 33 and the oil passage 35.

The check valve 40 is configured to allow oil to flow in only the direction from the discharge port 19a of the EOP 19 toward the oil passage 41. The check valve 40, the oil passage 39 and the oil passage 41 are provided inside the casing 43 (described later). In contrast, the oil passage 38 is provided outside the casing 43. The oil passage 38 and the oil passage 39 communicate with each other. In the example shown in FIG. 2, the EOP 19, together with the oil passage 38, is provided outside the casing 43.

Because the EOP 19 is provided as described above, it is possible to generate hydraulic pressure with the use of the EOP 19 by driving the EOP 19 using the output of the pump motor 20 when the engine 1 is stopped and it is not possible to generate hydraulic pressure with the use of the MOP 18. It is possible to supply oil, discharged from the EOP 19, to the oil receiving portions of the first motor generator 2, the second motor generator 3 and the power split mechanism 4 via the oil passage 38, the oil passage 39, the check valve 40, the oil passage 41, the oil passage 34, the oil passage 35 and the oil passage 36.

The above-described MOP 18, oil passages 32, 34, 36, 39, 41, check valve 33 and check valve 40 are provided inside the casing 43 that accommodates the first motor generator 2, the second motor generator 3 and the power split mechanism 4. In contrast, the oil cooler 37 and the oil passage 35 that communicates the oil cooler 37 with the oil passages 34, 36 are provided outside the casing 43 in order to increase the efficiency of cooling oil. In the example shown in FIG. 2, the EOP 19 and the oil passage 38 that communicates the EOP 19 with the oil passage 39 are also provided outside the casing 43. The EOP 19 may be installed inside the casing 43 together with the MOP 18. However, in this case, the internal space of the casing 43 is limited, so the flexibility of arrangement location decreases. Therefore, by setting the arrangement location of the EOP 19 outside the casing 43, it is possible to easily install the EOP 19. For example, by retrofitting the EOP 19 to an existing casing in which no EOP 19 is provided, it is possible to easily form the casing 43 in the hydraulic control system.

Generally, the output of the pump motor 20 that drives the EOP 19 is smaller than the output of the engine 1 that drives the MOP 18. Therefore, at a startup of the pump motor 20, at which load on the pump motor 20 increases, there is a concern that the reserve power of the pump motor 20 is small. For example, at the time of starting up the EOP 19 in a state where the viscosity of oil is high at a low temperature, there is a concern that the output of the pump motor 20 becomes insufficient. Particularly, as described above, when the EOP 19 is installed outside the casing 43, oil is more easily influenced by the outside air temperature. Therefore, when the outside air temperature is low, the temperature of oil decreases, and the viscosity of oil more easily increases. Therefore, in the hydraulic control system, a backflow circuit 44 is provided between the MOP 18 and the EOP 19 in order to ensure the favorable startability of the EOP 19 even in a state where the viscosity of oil is high at a low temperature.

Specifically, an oil passage 45 is provided between the oil passage 41 and the oil passage 39. The oil passage 45 communicates the oil passage 41 with the oil passage 39 by bypassing the check valve 40. In other words, the oil passage 45 is configured to be provided between the EOP 19 and the merging point 42 in the oil passage 34 so as to communicate the EOP 19 with the merging point 42 in the oil passage 34 by bypassing the check valve 40. An orifice 46 is provided in the oil passage 45. The orifice 46 is a throttle mechanism that regulates the flow rate of oil flowing through the oil passage 45. The oil passage 45 and the orifice 46, together with the check valve 40, are provided inside the casing 43.

In this way, in the hydraulic control system, because the backflow circuit 44, that is, the oil passage 45 and the orifice 46, are provided, it is possible to flow oil, discharged from the MOP 18, back to the EOP 19 side via the oil passage 45 and the orifice 46. For example, as described above, by not operating the engine 1 through combustion but motoring the engine 1, it is possible to generate hydraulic pressure by driving the MOP 18. It is possible to feed oil, which is discharged from the MOP 18 by hydraulic pressure generated by the MOP 18, under pressure to the EOP 19 via the oil passage 45 and the orifice 46.

The passage sectional area of the above-described check valve 40 in a state where the check valve 40 is open is configured to be larger than the passage sectional area of the orifice 46 in the oil passage 45. Therefore, oil, which is discharged from the EOP 19, flows into the merging point 42 and the oil passage 34 via the check valve 40. Because the check valve 33 is provided between the oil passage 34 and the MOP 18, oil flowing from the EOP 19 into the oil passage 34 does not flow back to the MOP 18 side. Therefore, it is possible to prevent leakage or waste of oil due to backflow of oil, which is discharged from the EOP 19, to the MOP 18 side. Therefore, it is possible to cause the EOP 19 to efficiently operate, with the result that it is possible to reduce the size and capacity of the EOP 19.

With the hydraulic circuit 30, when oil is discharged from the EOP 19, it is possible to prevent backflow of oil from the EOP 19 to the MOP 18 side without any particular control. For example, in the above-described system in JP 2013-142458 A, at the time when oil is discharged from the electric oil pump, it is required to execute control for changing the open/closed state of the electromagnetic valve in order to prevent backflow of oil from the electric oil pump to the mechanical oil pump side. In contrast, with the configuration of the hydraulic circuit 30, it is not required to change an oil passage or actuate a control valve, so it is possible to prevent backflow of oil from the EOP 19 to the MOP 18 side without any particular control.

In the example shown in FIG. 2, the oil passage 32, the oil passage 34, the oil passage 35 and the oil passage 36 correspond to a first oil passage according to the invention. The oil passage 38, the oil passage 39, the oil passage 41, the oil passage 34, the oil passage 35 and the oil passage 36 correspond to a second oil passage according to the invention. The check valve 33 corresponds to a first check valve according to the invention. The check valve 40 corresponds to a second check valve according to the invention. The oil passage 45 corresponds to a third oil passage according to the invention. The orifice 46 corresponds to a throttle mechanism according to the invention.

Figure 3:
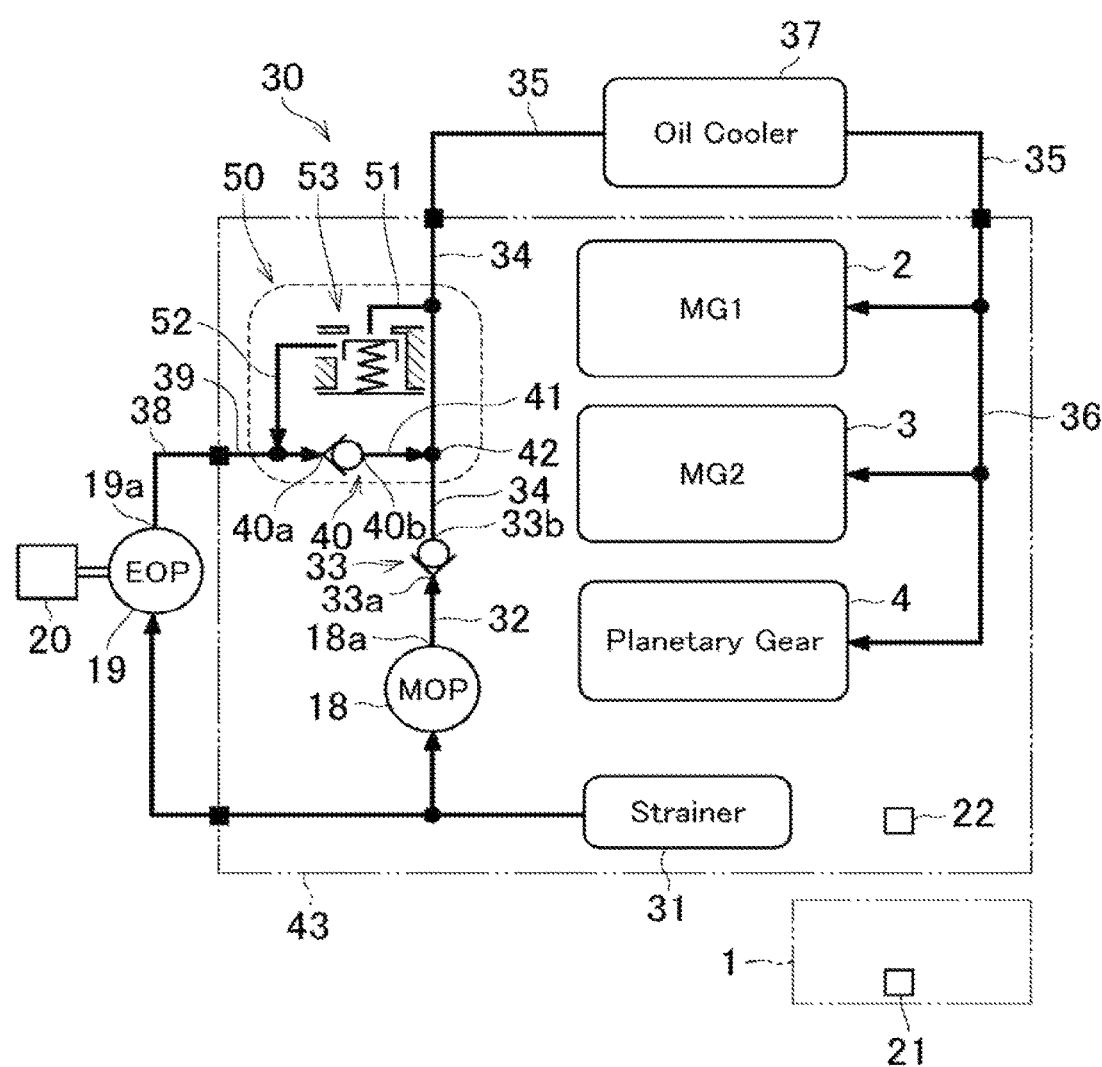
FIG. 3 is a view that shows another example of the hydraulic circuit that constitutes the hydraulic control system according to the invention.

The backflow circuit 44 including the oil passage 45 and the orifice 46 as described above may also be, for example, configured as a backflow circuit 50 shown in FIG. 3. The backflow circuit 50 includes an oil passage 51, an oil passage 52 and a relief valve 53. Specifically, the oil passage 51 and the oil passage 52 are provided between the merging point 42 of the oil passage 34 and the oil passage 39. The oil passage 51 and the oil passage 52 communicate the oil passage 34 with the oil passage 39 by bypassing the check valve 40. One end of the oil passage 51 communicates with the oil passage 34, and one end of the oil passage 52 communicates with the oil passage 39. That is, the oil passage 51 and the oil passage 52 are configured to be provided between the EOP 19 and the merging point 42 in the oil passage 34 so as to communicate the merging point 42 with the EOP 19 by bypassing the check valve 40. The relief valve 53 is provided between the other end of the oil passage 51 and the other end of the oil passage 52. The relief valve 53 is configured to, when the hydraulic pressure in the oil passage 51 exceeds a predetermined pressure, open to communicate the oil passage 51 with the oil passage 52. The oil passage 51, the oil passage 52 and the relief valve 53, together with the check valve 40, are provided inside the casing 43.

By providing the thus configured backflow circuit 50, it is possible to flow oil back from the MOP 18 side to the EOP 19 when there is an allowance in the flow rate of oil that is discharged from the MOP 18. Therefore, it is possible to reliably flow oil inside the casing 43 back to the EOP 19 side.

In the example shown in FIG. 3, the oil passage 51 and the oil passage 52 correspond to the third oil passage according to the invention. The relief valve 53 corresponds to the throttle mechanism according to the invention.

As described above, the EOP 19 and the oil passage 38 are installed outside the casing 43. Therefore, oil inside the EOP 19 or the oil passage 38 is easily influenced by the outside air temperature, and the viscosity of oil inside the EOP 19 or the oil passage 38 increases at a low temperature. As the viscosity of oil increases, load on the pump motor 20 increases at a startup of the EOP 19. In such a case, with the hydraulic control system, by motoring the engine 1 to drive the MOP 18, it is possible to forcibly flow oil back to the EOP 19 side with the use of the MOP 18 having a larger power than the EOP 19. That is, it is possible to feed relatively high-temperature low-viscosity oil, stagnating inside the casing 43, to the oil passage 38 and the EOP 19 under pressure. Oil, when forcibly fed under pressure with the use of the MOP 18, decreases in viscosity because of resistance or agitation at the time of flowing. Therefore, by forcibly feeding oil under pressure with the use of the MOP 18, it is possible to transfer low-viscosity oil to the EOP 19. As a result, it is possible to reduce the viscosity of oil inside the EOP 19 or the oil passage 38. Therefore, it is possible to reduce load on the pump motor 20 at a startup of the EOP 19, so it is possible to improve the startability of the EOP 19.

As described above, the EOP 19 is influenced by the temperature and viscosity of oil at a startup, and load on the pump motor 20 that drives the EOP 19 changes. Therefore, at the time of starting up the EOP 19, the EOP 19 needs to be driven by an appropriate procedure commensurate with the temperature and viscosity of oil. At the time of starting up the EOP 19 in a state where the viscosity of oil is high as described above, a failed startup that the EOP 19 is not appropriately started up may occur. In this case, it is necessary to accurately determine whether the failed startup is due to insufficient power of the pump motor 20 that drives the EOP 19 or the failed startup is due to a failure of the EOP 19 or the system other than the EOP 19. This is because, when the failed startup of the EOP 19 is due to a failure of the system, it is necessary to quickly stop or suppress driving of the EOP 19 in order to suppress useless consumption of electric power for driving the pump motor 20 or prevent a further secondary failure. The hydraulic control system according to the invention is configured to execute control described in the following example in order to appropriately start up the EOP 19 in response to the state of oil and to appropriately determine occurrence of the above-described failure.

Figure 4:
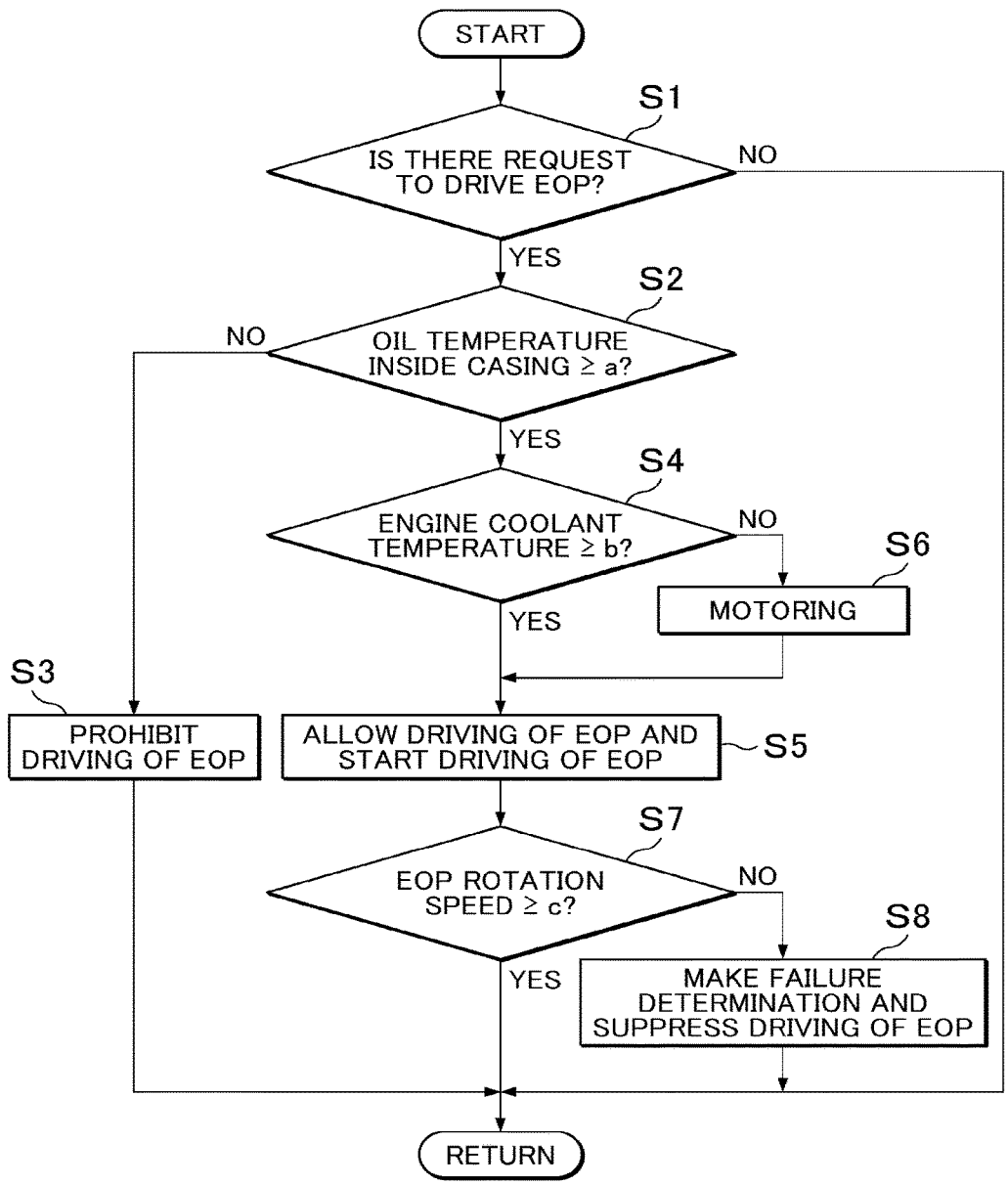
FIG. 4 is a flowchart for illustrating an example of control that is executed by the hydraulic control system according to the invention.

FIG. 4 is a flowchart that shows an example of control that is executed on the hydraulic control system according to the invention. Control shown in the flowchart of FIG. 4 is repeatedly executed at predetermined short intervals. Initially, it is determined whether there is a request to drive the EOP 19 (step S1). When negative determination is made in step S1 because of the fact that there is no request to drive the EOP 19 yet, the routine is once ended without executing the following control.

For example, when affirmative determination is made in step S1 because of the fact that there is a request to drive the EOP 19, such as when the vehicle Ve starts moving in EV traveling or when the operation of the engine is stopped by the idling stop function, the process proceeds to step S2. Then, it is determined whether the temperature of oil inside the casing 43 is higher than or equal to a predetermined oil temperature a. The predetermined oil temperature a is a threshold for determining whether the state of oil is a state where it is possible to appropriately drive the EOP 19. Generally, the viscosity of oil changes in response to the temperature of oil. As the temperature of oil decreases, the viscosity of oil increases. Therefore, by detecting the temperature of oil, it is possible to estimate the viscosity of the oil. As described above, as the viscosity of oil increases, a startup of the EOP 19 becomes more difficult. Therefore, in step S2, by comparing the temperature of oil, detected by the oil temperature sensor 22, with the predetermined oil temperature a, it is determined whether it is possible to start up the EOP 19. For example, when the temperature of oil inside the casing 43 is lower than the predetermined oil temperature a, the viscosity of oil is high for the power of the pump motor 20 that drives the EOP 19, and it is determined that it is not possible to appropriately start up the EOP 19.

Therefore, when negative determination is made in step S2 because of the fact that the temperature of oil inside the casing 43 is lower than the predetermined oil temperature a, the process proceeds to step S3, and driving of the EOP 19 is prohibited. If the EOP 19 is driven in a state where the temperature of oil is low, that is, the viscosity of oil is high, to such an extent that it is not possible to appropriately start up the EOP 19 as described above, electric power is consumed uselessly. This may also lead to a case where the pump motor 20 becomes an overload state. Therefore, in step S3, when the temperature of oil inside the casing 43 is lower than the predetermined oil temperature a as described above, driving of the EOP 19 is quickly prohibited. Therefore, it is possible to suppress useless consumption of electric power. It is also possible to protect the pump motor 20 by avoiding an overload on the pump motor 20. When driving of the EOP 19 is prohibited in step S3 in the above-described manner, the routine is once ended thereafter.

In contrast, when affirmative determination is made in step S2 because of the fact that the temperature of oil inside the casing 43 is higher than or equal to the predetermined oil temperature a, the process proceeds to step S4. It is determined whether the temperature of coolant of the engine 1 is higher than or equal to a predetermined coolant temperature b. The predetermined coolant temperature b is a threshold for determining whether the outside air temperature that is estimated from the temperature of coolant of the engine 1 is in a state where it is possible to appropriately drive the EOP 19. As described above, in the vehicle Ve, the coolant temperature sensor 21 that detects the temperature of coolant of the engine 1 is, for example, installed around the radiator of the engine 1. Therefore, it is possible to estimate the outside air temperature from a detected value of the coolant temperature sensor 21.

In control of step S4, not the coolant temperature sensor 21 but data of an outside air temperature detected by the outside air temperature sensor, or the like, may be directly used. However, the outside air temperature sensor is not a designated subject in onboard diagnosis (OBD) regulation that obliges a diagnosis of a malfunction in an emission gas control system for a vehicle and installation of a warning system, or the like, in case of a malfunction. On the other hand, the coolant temperature sensor 21 of the engine 1 is generally a sensor that is designated in the OBD regulation. Therefore, by executing control using data of the coolant temperature sensor 21 as described above, it is possible to adapt the control to the OBD regulation.

When affirmative determination is made in step S4 because of the fact that the temperature of coolant of the engine 1 is higher than or equal to the predetermined coolant temperature b, the process proceeds to step S5. That is, when the temperature of coolant is higher than or equal to the predetermined coolant temperature b, it is estimated that the temperature of oil inside the casing 43 and the outside air temperature is high, so it is possible to determine that the viscosity of oil is low and it is possible to appropriately drive the EOP 19. Therefore, in this case, the process proceeds to step S5, and driving of the EOP 19 is allowed. At the same time, driving of the EOP 19 is started.

In contrast, when negative determination is made in step S4 because of the fact that the temperature of coolant of the engine 1 is lower than the predetermined coolant temperature b, the process proceeds to step S6. By motoring the engine 1, the MOP 18 is driven to discharge oil. In this state, the EOP 19 is not driven yet, and is not generating hydraulic pressure. Therefore, oil discharged from the MOP 18 is fed under pressure to the inside of the oil passage 38 and the EOP 19, provided outside the casing 43, via the oil passage 45 and orifice 46 of the backflow circuit 44. As a result, relatively high-temperature oil inside the casing 43 is transferred to the EOP 19 side, and the temperature of oil inside the EOP 19 rises. That is, the viscosity of oil inside the EOP 19 decreases. Therefore, load on the pump motor 20 at the time of driving the EOP 19 is reduced, so it is possible to appropriately start up the EOP 19.

Figure 5:
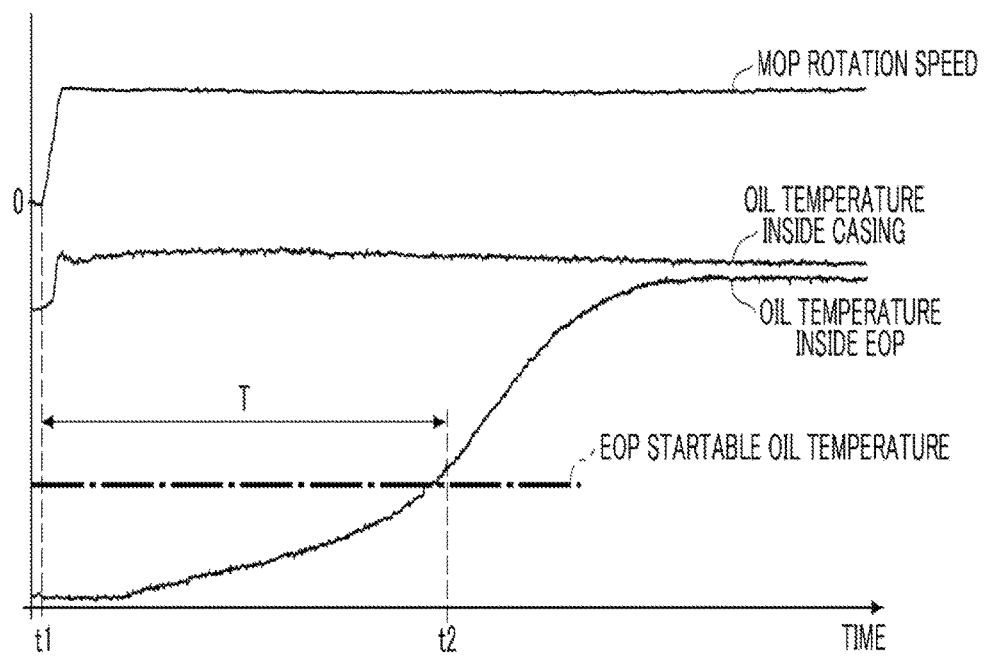
FIG. 5 is a time chart for illustrating a required motoring time in the case where the control shown in the flowchart of FIG. 4 is executed.

A motoring time T is set as a time for motoring the engine 1 in order to flow oil back by driving the MOP 18 as described above. The motoring time T may be, for example, set as a period from time t1 at which motoring of the engine 1 is started to time t2 at which the temperature of oil inside the EOP 19 reliably exceeds an EOP startable oil temperature, as shown in FIG. 5. The EOP startable oil temperature is a threshold for determining whether a startup of the EOP 19 is possible. Therefore, when the temperature of oil inside the EOP 19 becomes higher than or equal to the EOP startable oil temperature, it is determined that a startup of the EOP 19 is possible. The motoring time T may be set in advance on the basis of the result of an experiment, simulation, or the like.

When motoring of the engine 1 is carried out for the motoring time T as described above, the process proceeds to step S5, and driving of the EOP 19 is allowed. At the same time, driving of the EOP 19 is started.

Instead of motoring the engine 1 in order to drive the MOP 18 in step S6, it is also possible to drive the MOP 18 by starting up the engine 1. That is, the MOP 18 may be driven by operating the engine 1 through combustion in this case, in comparison with the case where motoring of the engine 1 is carried out, it is possible to drive the MOP 18 by using a larger output. Therefore, it is possible to reliably flow oil inside the casing 43 back to the EOP 19 side. When the engine 1 is operated, the temperature of coolant of the engine 1 and the temperature of oil inside the casing 43 rise, and the viscosity of oil decreases, with the result that a startup of the EOP 19 becomes much easier.

In addition, in this control, after driving of the EOP 19 is started in step S5, it is determined whether the rotation speed of the EOP 19 is higher than or equal to a predetermined rotation speed c (step S7). The predetermined rotation speed c is a threshold for determining whether the EOP 19 is being properly driven at the time when the EOP 19 is driven. For example, a lower limit of the rotation speed of the EOP 19 in the case where the EOP 19 is being properly driven is set as the predetermined rotation speed c.

When affirmative determination is made in step S7 as a result of the fact that the rotation speed of the EOP 19 is higher than or equal to the predetermined rotation speed c, the EOP 19 is being normally driven, so it is not necessary to particularly execute other control. Therefore, in this case, the routine is once ended.

In contrast, when the rotation speed of the EOP 19 is lower than the predetermined rotation speed c, the rotation speed of the EOP 19 has not increased to a normal rotation speed although it is determined that it is possible to appropriately drive the EOP 19. That is, in this case, the EOP 19 is not normally rotating although it is determined that the power of the pump motor 20 is sufficient to start up the EOP 19. Therefore, when negative determination is made in step S7 because of the fact that the rotation speed of the EOP 19 is lower than the predetermined rotation speed c, the process proceeds to step S8, and it is determined that any failure is occurring in the EOP 19 or around the EOP 19. At the same time, driving of the EOP 19 is suppressed. For example, driving of the EOP 19 is stopped. Alternatively, the EOP 19 is driven at a required minimum output.

In this way, by considering the state of fluctuation in the rotation speed of the EOP 19 after driving of the EOP 19 is started, it is possible to quickly determine occurrence of a failure. Therefore, when there occurs a failure, it is possible to suppress excessive consumption of electric power at the time when the EOP 19 is driven. It is also possible to prevent occurrence of a secondary failure due to the fact that the EOP 19 is continuously driven in a state where there is a failure. When driving of the EOP 19 is suppressed in step S8 as described above, the routine is once ended thereafter.

The hydraulic control system according to the invention is applicable to a vehicle other than the vehicle Ve on which the engine 1 and the two motor generators, that is, the first motor generator 2 and the second motor generator 3, are mounted as the driving force sources as shown in FIG. 1. That is, the vehicle that may be a subject of the invention may be, for example, a hybrid vehicle in which an engine and a single motor generator are used as driving force sources. Alternatively, the vehicle that may be a subject of the invention may be not a hybrid vehicle but an existing vehicle that uses an engine as a driving force source. In any case, a vehicle including a mechanical oil pump that is driven by the output of a driving force source to generate hydraulic pressure and an electric oil pump that is driven by an electric motor different from the driving force source to generate hydraulic pressure may be a subject of the invention.

What is claimed is:

1. A hydraulic control system for a vehicle including at least an engine, the hydraulic control system comprising:
a first oil pump that is a mechanical oil pump, the first oil pump being configured to be driven by a driving force source of the vehicle to generate hydraulic pressure;
a second oil pump that is an electric oil pump, the second oil pump being configured to be driven by an electric motor to generate hydraulic pressure, and the electric motor being different from the driving force source;
an oil receiving portion configured to be supplied with oil that is discharged from the first oil pump or the second oil pump;
a first oil passage configured to provide communication between the first oil pump and the oil receiving portion;
a second oil passage configured to provide communication between the second oil pump and the oil receiving portion;
a first check valve provided between a merging point and the first oil pump, the first check valve being configured to allow oil to flow in only a direction from the first oil pump toward the oil receiving portion, and the merging point being a portion at which the first oil passage and the second oil passage merge with each other;
a second check valve provided between the merging point and the second oil pump, the second check valve being configured to allow oil to flow in only a direction from the second oil pump toward the oil receiving portion;
a third oil passage configured to provide communication between the merging point and the second oil pump by bypassing the second check valve, and the third oil passage including a throttle mechanism, the third oil passage being configured to restrict a flow rate of oil that is discharged from the second oil pump;
an electronic control unit;
a casing that accommodates at least the first oil pump;
an oil temperature sensor configured to detect a temperature of oil inside the casing; and
a coolant temperature sensor configured to detect a temperature of coolant of the engine, wherein
the first oil pump is configured to be driven by rotating the engine to generate hydraulic pressure,
oil is able to flow from the first oil pump to the second oil pump via the third oil passage,
the electronic control unit is configured to drive the second oil pump, when the temperature of the oil inside the casing is higher than or equal to a predetermined oil temperature and the temperature of the coolant is higher than or equal to a predetermined coolant temperature, and
the electronic control unit is configured to drive the second oil pump after first rotating the engine to drive the first oil pump, when the temperature of the oil inside the casing is higher than or equal to the predetermined oil temperature and the temperature of the coolant is lower than the predetermined coolant temperature.

2. The hydraulic control system according to claim 1, wherein the electronic control unit is configured to stop the driving of the second oil pump, when a rotation speed of the second oil pump is lower than a predetermined rotation speed after the second oil pump is driven.

3. The hydraulic control system according to claim 1, wherein the electronic control unit is configured to drive the second oil pump at a predetermined lower output, when a rotation speed of the second oil pump is lower than a predetermined rotation speed after the second oil pump is driven.

* * * * *